United States Patent [19]
Taylor

[11] 3,933,967
[45] Jan. 20, 1976

[54] METHOD OF MAKING SEAMLESS HOLLOW MOLDED ARTICLES

[76] Inventor: Don A. Taylor, 216 Mill St., Wadsworth, Ohio 44281

[22] Filed: Apr. 1, 1974

[21] Appl. No.: 456,529

Related U.S. Application Data

[63] Continuation-in-part of Ser. No. 333,872, Feb. 20, 1973, abandoned.

[52] U.S. Cl. ............... 264/248; 156/228; 156/245; 156/292; 264/236; 264/250; 264/327; 425/519
[51] Int. Cl.² ........................................ B29H 7/02
[58] Field of Search ............ 264/89, 90, 92, 93, 96, 264/248, 236, 347, 250, 327; 156/228, 245, 292; 425/519

[56] References Cited
UNITED STATES PATENTS

| | | | |
|---|---|---|---|
| 1,134,433 | 4/1915 | Aylsworth et al. | 264/248 X |
| 1,365,462 | 1/1921 | Crawford | 264/248 X |
| 1,575,388 | 3/1926 | Roberts | 264/96 X |
| 1,813,797 | 7/1931 | Foley | 264/248 X |
| 2,363,508 | 11/1944 | Doster et al. | 264/327 |

Primary Examiner—Jan H. Silbaugh
Attorney, Agent, or Firm—John Harrow Leonard

[57] ABSTRACT

Seamless hollow molding rubber articles are produced by concurrently molding two article halves with mateable edges which extend toward each other. Portions of the mold plates and core are maintained continuously at the full vulcanizing heat until the halves of the articles have been vulcanized to about 60 percent of the optimum vulcanization of the material, except for thin strata defining the mateable edges. By cooling at the portions which form these strata, these portions are maintained at a lesser temperature to cause the reaction in these strata to progress slightly beyond the scorching or blowing stage to dimensional and volumetric stability. At this stage, the mateable faces of the edges are substantially free from the usual "skin" effect which effect would render them non-fusible. The mold is then opened, the core is removed, and the mold is reclosed. The article halves are resilient, but firm enough to force the strata of the mateable edges into firm pressure bonding and fusing contact without distortion of the remainder of the halves. Due to the limited amount of material in the strata, only a small total amount of heat is required to carry the vulcanization reaction of the strata to the same stage as that of the halves. Consequently, the heat of the mold and of the remainder of the halves is sufficient to fuse and vulcanize the mateable edge strata quickly and fully. The resultant bond of the edges and adjacent strata is homogeneous with the remainder of the halves.

7 Claims, 10 Drawing Figures

METHOD OF MAKING SEAMLESS HOLLOW MOLDED ARTICLES

CROSS REFERENCE TO RELATED APPLICATIONS

This invention relates to a method for molding seamless hollow articles, and particularly hollow spheres, such as tennis ball cores, golf ball cores, and the like, and includes improvements on the method disclosed in my copending applications, Ser. No. 143,919, filed May 17, 1971 now U.S. Pat. No. 3,832,437, and entitled "Method and Apparatus for Forming Hollow Articles," and Ser. No. 333,872, filed Feb. 20, 1973, now abandoned and entitled "Hollow Molded Articles" and is a continuation-in-part Ser. No. 333,872.

BACKGROUND OF THE INVENTION

1. Field of Invention

Molding of thermally curable organic plastic materials.

2. Description of Prior Art

For purposes of illustration, the present invention is described herein as applied to tennis ball cores of elastomeric material such, for example, as conventional natural or synthetic rubber compositions, its application to other hollow articles, whether of spherical or other shape, and to other elastomeric materials and compositions, being apparent from the illustrative example. It is difficult, by prior methods, to mold seamless hollow spherical articles to precise shapes and dimensions, both internally and externally, while providing walls of uniform thickness and quality throughout and a joint comparable to the strength of the remainder of the article. Generally, such articles are molded as mating halves which subsequently are joined together along a diametral plane.

One of the earlier methods is to mold and fully vulcanize two halves of the article separately and, after full vulcanization and cooling of the halves, to cement them together to form the finished article by applying cementitious material to the exposed edge surfaces of the halves. This method is the one most commonly used at present despite the fact that bonding the joint by extraneous cementitious material renders the juncture non-homogeneous, and weak compared to the walls.

In later methods, such as disclosed in U.S. letters Pat. No. 1,575,388 to F. T. Roberts, issued Mar. 22, 1926, devised to provide a fused and improved edge bond, the mating halves of an article are formed by molding raw material to shape about a core. The mold is then opened, the core removed, and all excess raw material is removed for immediate reuse without any reconditioning in the next production cycle. While the molds are open a gassing agent is introduced into the raw molded halves. The mold is then closed to press the raw halves together to form the assembled raw article and the raw articles is then vulcanized. During the initial stage of heating, the gassing agent evolves sufficient gaseous pressure within the raw article to assure that the material maintains its position and shape in the mold cavity and remains in firm contact with the cavity walls during vulcanization. This later method has some advantages. For example, the molding and removal of the core are effected while the material remains in its raw condition so that the excess raw material surrounding the mold cavity can be removed, when the mold is opened and the core is removed, and immediately reused in the next succeeding molding operation. It had disadvantages in that generally beads or flash of substantial amount are formed at the seam or juncture of the two halves. Further, the seam tends to be weak due to the fact that the raw material of the halves cannot transfer substantial bonding pressure to the mating edges, upon closure of the mold after removal of the core, and cannot maintain substantial pressure on the edges during vulcanization.

Another disadvantage is that the gassing agent necessarily develops pressure for holding the raw rubber in contact with the mold walls during initial vulcanization subsequent to removal of the core. If the mold is opened and the vulcanized articles are exposed or removed from the mold while still hot, the internal gaseous pressure expands the balls or articles unpredictably so that they are out of round and otherwise distorted. This can be overcome only the time consuming step of cooling the articles in the mold sufficiently to cool the gases therein while the articles remain in the closed mold, or by forming a perforation in each article sufficient to vent and permit the excape of the warm expanded gas and relief of the internal pressure before or immediately upon opening of the mold.

This method and similar earlier methods are not in general use today because it is economically impractical to obtain properly shaped products with properly fused edges consistently. The difficulties reside first in the complexities involved in the internal pressurizing and depressurizing. Second, to avoid the "skin effect," the raw elastomer must be exposed initially to very moderate, substantially non-vulcanizing temperatures, which, in turn, makes it necessary in each cycle to cool the mold from the optimum vulcanizing temperature to a substantially non-vulcanizing temperature, and then raise the mold temperature from substantially non-vulcanizing temperature up to optimum vulcanizing temperature and hold the latter temperature until the cycle is completed. This complicates the equipment required and extends unduly the process time.

The inventions disclosed in my copending applications provide solutions to many of these problems by forming on the two halves, respectively, mateable aligned edged which are shaped and arranged to extend a preselected small distance beyond the parting surface of the two mold plates so that after the core is removed, better contact between these edges upon reclosure of the mold is assured. While the mold remains closed with the core therein, the vulcanization reaction is initiated and caused to progress to a generally uniform degree throughout the charge such that the halves of the article in the mold cavity, including the mateable edges, are sufficiently firm to retain their configuration and remain in contact with the cavity walls without the need for internal gas producing agents after removal of the core and reclosure of the mold. After the removal of the core, the mold is closed and vulcanization of all portions is carried to the optimum selected degree. This uniform degree of vulcanization is less than that which the material is to have in the finished product, which latter is referred to herein as the "optimum vulcanization" and which is about 95 percent of the ultimate vulcanization of which the material is capable.

This prior method is a compromise between the desirability of having the parts fully vulcanized before removal of the core and having the surface strata at and adjacent the mateable edges substantially free from skin effect and at a sufficiently low degree of vulcanization so that, upon removal of the core and reclosure of the mold, these strata can fuse and bond together properly into a homogeneous juncture upon completion of the vulcanization stage of the remainder of the halves of the article in the mold cavity. This generally requires that the initial vulcanization before core removal be below 250° F., much less than the optimum vulcanizing temperature.

SUMMARY

In accordance with the present invention, the mold and core, except for the portions which are to form the mateable edges, are maintained continuously at the temperature required for effecting the optimum vulcanization. While the mold is closed with the core therein the vulcanization reaction of the material forming the article havles, except for thin strata at and adjacent the mateable edges, at which localized areas the core is cooled to eliminate the skin effect, is caused to proceed to a high degree of about 60 percent of the optimum vulcanization. During this high degree of vulcanization of the halves, the strata at and adjacent the mateable edges, because of the localized core and mold cooling, are subjected to less heat so that instead of the vulcanizing reaction thereof being carried to the same high degree, it is carried to a lesser degree which is just above the "blow" or "scorch" stage. This blow or scorch stage is that at which the material being vulcanized would foam if it were unconfined or not held under molding pressure by the mold. As a result, the strata have volumetric and dimensional stability while retaining their fusing and bonding capabilities to a very high degree, or substantialy unimpaired. The skin effect is prevented. Therefore, when the molding pressure is relieved, the halves except for the strata, are resilient, but firm, and the strata, instead of foaming and expanding, are dimensionally stable and free from the skin effect, so that upon reclosure of the mold the halves apply sufficient pressure to the strata to cause them to intermingle, fuse, and bond into a juncture homogeneous with the halves.

The method has the advantages that the time cycle is very greatly reduced. Since gassing agents are not required in the halves, the mold can be opened and the molded articles removed, and the mold cavities recharged with material, immediately upon completion of the vulcanization to the optimum degree, without the usual time delay for cooling necessary in prior methods to prevent distortion by the contained gas.

No extraneous cementitious material is required, nor is any transfer of the articles or parts thereof from one mold to another necessary, thus other time consuming steps are eliminated.

The mold cavities and core are continuously heated, at the optimum vulcanizing temperature selected for the particular elastomer, even during charging of the material and removal of the article, whereby the need for repeated cooling and reheating during each cycle are eliminated and the time cycle is greatly shortened, thereby effecting great economies. The initial vulcanization of the halves is carried so far that distortion is eliminated while the edge strata to be bonded are made dimensionally stable, yet retain their fusing and bonding capabilities substantially unimpaired and remain free from skin effect, thus assuring consistent quality.

Various specific objects and advantages of the invention will become apparent from the following description wherein reference is made to the drawings.

DESCRIPTION OF THE PREFERRED EMBODIMENT

Most elastomeric materials, when brought into direct contact, under molding pressure, with a mold, or core, which is heated to the high degree subscribed or to the opimum vulcanizing temperature, develops a so-called "skin cure" or "skin effect." This skin effect is a surface or superficial vulcanization, initial or partial, which causes a change in the chemical and physical characteristics in the material to a slight depth, resulting in a thin superficial film which is deterimental to proper surface fusing with other like material. This skin effect is generally produced almost immediately upon contact of the material with a mold or core preheated to optimum vulcanizing temperature.

Without reaching the optimum vulcanizing temperature of the composition, however, the vulcanization reaction at the edges can be carried to slightly above the so-called blow or scorch stage of the composition. The blow or scorch stage is that at which time the reaction has proceeded to a degree such that if the molding pressure were relieved, the material would expand and foam into a closed cell or a reticulated porous structure.

In the present invention, degrees of vulcanization less than the optimum vulcanization, which is preselected in accordance with the use to which the article is to be put, are employed at different portions of the article. These degrees are obtained by subjecting portions of the material, while it is confined under molding pressure in the mold, to differentials in temperature by maintaining the mold and core heated to different degrees at different localized areas.

The vulcanization reaction, except at the mateable edges, may be carried to a high degree which is much beyond the blow or scorch stage of the material, being sufficiently far thereabove so that the fusing and bonding capabilities of the material with like material in the same condition is substantially eliminated. Usually this is about 60 percent or more of the degree to which the reaction is to be carried for the selected optimum vulcanization of the finished article. The optimum vulcanization, in turn, is usually from 75 to 95 percent of the ultimate degree of vulcanization of which the material is capable.

Again, the material may be partially vulcanized, in which condition the reaction has been constrained to less than this high degree by subjecting it to less than full vulcanization temperature initially. To control this degree of vulcanization by initially subjecting the material to full temperature for a lesser time generally produces the skin effect and is impractical.

Quite often a limited vulcanization is the result of causing the chemical reaction to proceed slightly beyond the scorch or blow stage, but high enough so that the material has reached volumetric and dimensional stability while retaining substantially unimpaired its capabilities of fusing and bonding with like material in like condition.

In the present method the reaction at the edges is caused to proceed slightly beyond this blow or scorch stage, as otherwise the material would foam or expand upon opening of the mold and removal of the core, instead of retaining the material in the proper molded shape and condition imposed by the core and mold cavity.

The article is produced by concurrently molding about a core in aligned companion mold cavities under conventional molding pressure, for example, about 1000 pounds per square inch, two article halves with mateable edges which, as described in my copending applications, extend toward each other beyond the parting surfaces of the mold plates. A controlled differential in the degree of vulcanization of the different portions of the halves is maintained by differential heating of the mold and cooling of the core such that the article halves are first formed about the core, the core is removed without changing the shape of the halves, and the mold is reclosed to join the halves and produce the final article. This differential is such that the article halves, beginning at a very slight depth from the outer end faces of the mateable edges and continuing throughout the remainder of the halves are vulcanized to a high degree less than the optimum, as hereinbefore defined.

To carry the reaction too close to optimum vulcanization would require such precision in temperatures at different portions of the mold and core and such precision in timing that the operating costs would more than offset the conomies of the method. This is because a vulcanizing reaction cannot be stopped instantly at a precise degree. When the reaction is one initiated, then, due to the inherent characteristics of the composition, the persistence of residual heat in the mold and core, and the lag in heat transfer to, or dissipation of heat from, the material tends toward overrun of the desire degree of vulcanization.

Accordingly, the vulcanization reaction of the halves, except for a thin stratum of the material at and adjacent the outer end of the mateable edge of each half, and extending from the mateable end face of the mateable edge to a slight depth, preferably of one or a few thousandths of an inch, is caused to proceed to a high degree of vulcanization of about 60 percent of the optimum. Concurrently, by maintaining a proper lower temperature at the end edge surfaces, the reaction is reduced to a degree so that it proceeds only slightly beyond the blow or scorch point. Due to this lower or limited degree of vulcanization, the edge strata retain substantially their full capabilities of fusion and bonding with each other into a homogeneous mass even though the halves otherwise have reached a high degree of vulcanization. At this stage, the margins of the halves adjacent the surface strata of the mateable edges are resilient, but sufficiently firm and set so that, upon closure of the mold after removal of the core, they can apply on these strata sufficient pressure to force them against each other into optimum fusing and bonding relation and thereby to cause the strata to coalesce and fuse and bond together. These strata are very thin and therefore they quickly reach the temperature of the remainder of the article and become vulcanized substantially concurrently with the remainder. The result is that the finished article is substantially seamless, these strata having the same consistency and characteristics in the finished article as the reminder of the article halves and the juncture being homogeneous with the remainder of the halves, and free from beads and from appreciable flash. The article is homogeneous throughout. These effects are accomplished as mentioned, by differential heating, preferably by differential heating and cooling at selected portions of the mold core.

The invention has the distinct advantages of producing in a shorter and more efficient cycle a better quality product with greater precision in dimension, shape, and consistency, and a more effective bond and fusion at the mateable edges to each other. The mold and core can be heated at selected localized locations to a high curing or vulcanization preparatory to charging, and thereafter maintained thereat continuously throughout successive work cycles. At the same time, other localized portions are cooled to the lower temperature required to cause the limited vulcanization and the localized portions of the core are maintained continuously at this lower temperature throughout the work cycles. There is no interruption in the degree of heat of the mold cavities between cycles, or during any cycle, and there is no internal differential in pressure within and outside of the article. Consequently no cooling time is required for the molds and core between and during successive work cycles.

Figure 1:
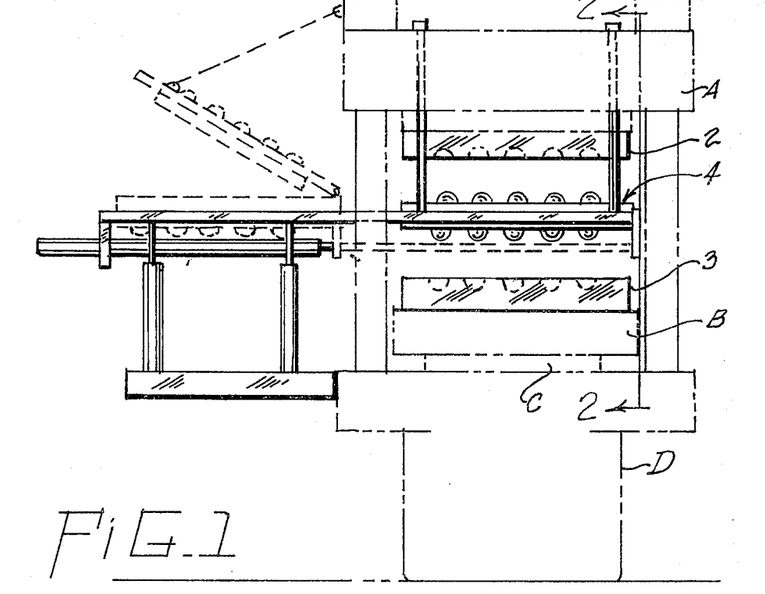
FIG. 1 is a front elevation illustrating a mold and core combination of the present invention installed in a conventional press.
Figure 2:
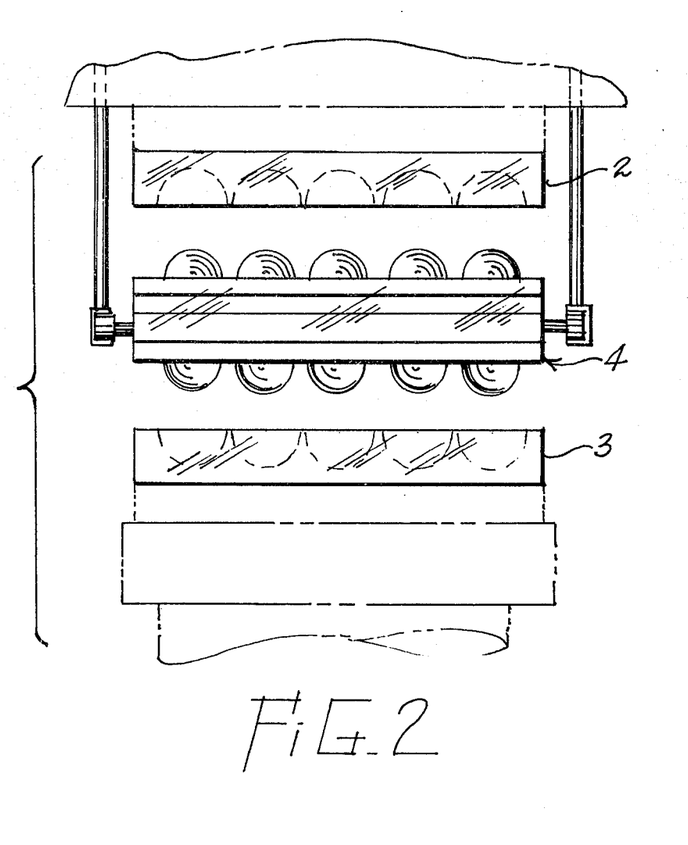
FIG. 2 is an enlarged fragmentary side elevation of the mold and core combination shown in FIG. 1, part of the press being indicated for clearness in illustration.

Referring to FIG. 1, the molding operation is performed in a conventional press having an upper fixed platen A, a lower movable platen or bolster B which is lifted and lowered by a piston C, operating in a hydraulic cylinder D. As more fully disclosed in my above identified copending application, Ser. No. 143,919, now U.S. Pat. No. 3,832,437, a piston and cylinder assemblage E is provided for sliding the bottom plate of the mold onto a support F for purposes of removing molded articles and recharging the mold. A piston and cylinder assemblage G is provided for sliding the core assemblage from between the mold plates. The core is supported on suitable vertically floatable trackage for facilitating this operation with the specific mold and core arrangement herein disclosed.

The mold, indicated generally at 1, comprises a multi-cavity upper mold plate 2 and a companion multi-cavity lower mold plate 3. The upper mold plate 2 is secured to the upper platen A, and the lower mold plate 3 is supported on the bolster or lower platen B for movement therewith toward and away from the upper platen and mold plate 2. This structure is known in the art and forms no characterizing part of the present invention. A specialized core 4 for cooperation with the mold plates is provided.

Figure 3:
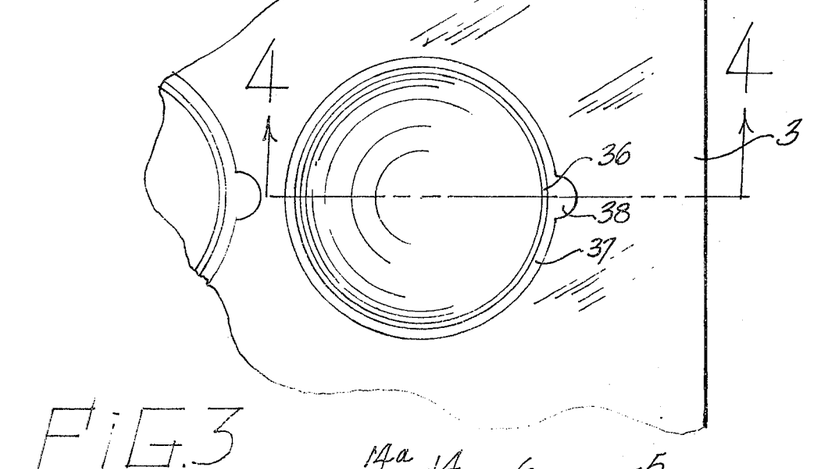
FIG. 3 is an enlarged fragmentary top plan view of the lower section or plate of the mold of FIG. 1, showing a typical cavity arrangement.
Figure 4:
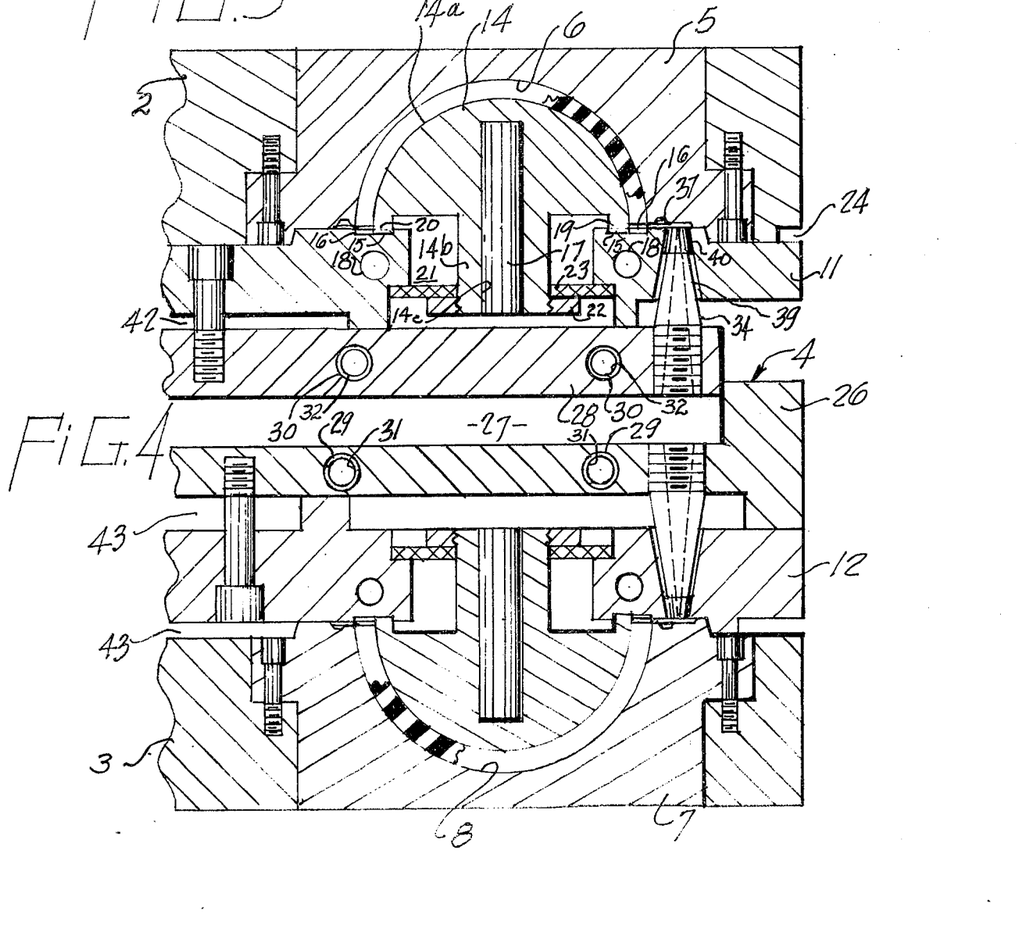
FIG. 4 is an enlarged fragmentary vertical sectional view of the mold and core, taken on the line 4—4 in FIG. 3, showing the mold and core in molding position, the molded article being shown in part only for clearness in illustration.
Figure 5:
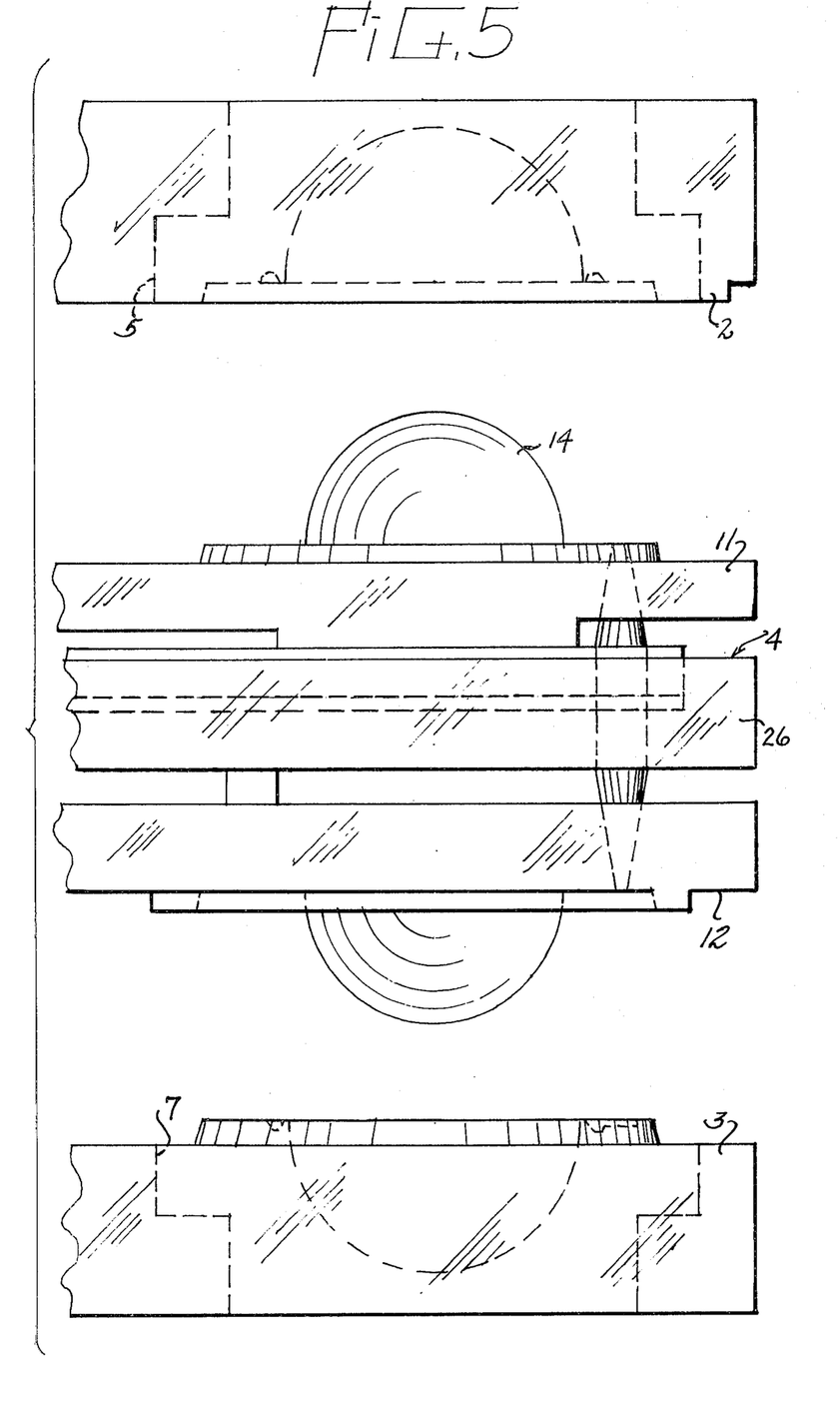
FIG. 5 is a fragmentary front elevation of the mold and core showing the mold in fully open position and the core in a partial molding position.

In general, the upper and lower mold plates are essentially the same. As best illustrated in FIG. 3, the upper mold plate 2 carries a plurality of hardened inserts 5, each of which has a downwardly open hemispherical mold cavity 6. Correspondingly, the lower mold plate 3 carries a plurality of inserts 7 each of which has an upwardly opening hemispherical mold cavity 8 in alignment with an associated one of the mold cavities 6.

Assuming first that the mold 1 is to be used in the conventional compression molding operation employing about 1000 pounds per square inch mold closing pressure, the core 4, on its upper face, carries a cooling plate 11 and, on its lower face, carries a cooling plate 12. These plates are essentially the same in form and function.

Figure 7:
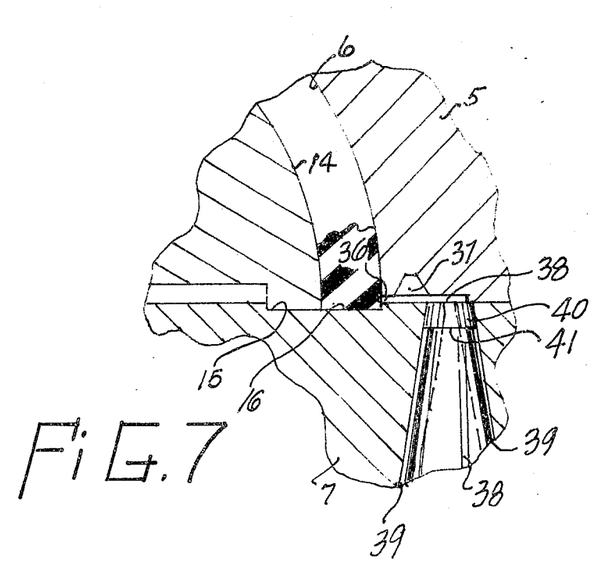
FIG. 7 is an enlarged vertical fragmentary sectional view of the upper mold plate and core showing a sprue and ring gate thereof.

Mounted on the upper face of the plate 11, and forming therewith part of the core, are metal core elements 14, arranged one for each cavity 6. Each core element 14 comprises a head 14a and a neck 14b. Each head 14a is convex and spherical upwardly, and arranged to be concentric with its associated cavity 6 when the mold is closed onto the core so as to define with the wall of its associated cavity 6 a hemispherical portion of a hollow article. However, as described in my copending application, it is desirable that the hemispherical portion have a mateable peripheral edge at its open side and for this purpose, as best illustrated in FIG. 7, the plate 11 is provided with an annular groove 15 which is coaxial with the core element 14. The peripheral margin of the head 14a, at the open side of the cavity, extends downwardly beyond the diametral plane of the hemisphere to the bottom of the groove 15 so that, along with one side wall and the bottom wall of the groove, the peripheral margin defines an annular edge-forming channel 16 which is coextensive in radial width with the space between the cavity wall 6 and the exterior spherical wall of the head 14a at the parting surface of the mold plate 2 and the core cooling plate 11. As a result, the molded half of the article has an annular mateable edge which, when the core assembly 10 is removed from the mold, extends downwardly beyond the parting plane, or line of the plate 2 a slight distance, for example, about 0.005 to 0.020 inches. As described more fully in my copending application, this protruding mateable edge portion is such that when the core is removed and the mold plates are brought together, the surface stratum at the end of the mateable edge in the article half in the upper mold cavity 6 and the surface stratum at the end of the mateable edge in the lower mold cavity 8 will be brought into contact prior to final closure of the mold and, upon closure, the strata of the mateable edges will be pressed against each other under adequate pressure to assure compressing, fusing, and bonding of the mateable edges, as is later described herein.

As mentioned, the mold plates 2 and 3, and the core elements 14 are to be maintained at all times at the optimum vulcanizing temperature of the material necessary so that the material in the cavities is subjected thereto throughout the molding operation, beginning immediately upon the initial introduction of the material into the cavity. This is to assure that the material reaches the optimum degree of vulcanization in the shortest possible time. At the same time, the mateable edges are maintained at the lower temperature for the limited degree of vulcanization and free from any skin effect, throughout the strata extending from the outer end faces of the mateable edges inwardly normal to the faces for a very limited depth. For this purpose, the plates 2 and 3, and the core elements 14, are maintained continuously at their selected high temperature in any conventional manner, the core elements 14 being individually heated usually to the same temperature as the plates 2 and 3. To this latter end, the necks 14b have central bores 14c, respectively, in which electrical heating elements 17 are arranged. Each bore 14c extends from the bottom of its associated neck 14b almost to the top surface of the associated head 14a. By means of these heating elements, the core elements 14 are heated to the temperatures required for optimum vulcanization.

There remains the problem of maintaining the localized areas of the mold plates 2 and 3 and the core elements 14 at the optimum temperature throughout the entire operation, so as to vulcanize the articles to about 60 percent of the optimum vulcanized condition in a minimum time cycle before removing the core, yet retain the mateable edges in plastic and readily fusible condition. This requires that a differential in temperature be maintained between the walls of the cavities 6 and heads 14a of the core elements 14, on the one hand, and the side walls and bottoms of the channels 16, on the other hand. Accordingly, the plate 11 is provided with a plurality of coolant passages 18 so arranged that a coolant or media at a lower temperature than that of the cavities can be circulated therethrough to maintain the temperature of the plate 11 at and adjacent the channels 16 at the required lower temperature to effect only limited vulcanization to just above scorch or blow condition while the remainder of the mold plate 2 and the heads of the core elements 14 are maintained at the temperature for optimum vulcanization.

For rubber compositions such as used in tennis ball cores, the temperature for optimum vulcanization may be from 320° F. to 400° F. while the temperature for the limited vulcanization may be about 250° F. or less. The specific arrangement of the passages 18 is not critical except to the extent that they should be placed so as to cause the reduced heating effect at the bases of the channels 16 in the plate 11 and closely adjacent portions of the mold plate 2.

Further, to assist in maintaining the proper differential in temperature at the mateable edges relative to the temperature in the major portion of the cavity 6, the head 14a of each core element 14 is undercut, as indicated at 19, so that only its outer peripheral marginal edge 20 engages the plate 11.

Each element 14 is aligned with an enlarged opening 21 in the plate 11. The neck 14b extends into the associated opening 21 and is very much less in diameter than the open 21 so as to provide an air insulating space for eliminating the direct metal to metal conduction of heat from the core element 14 to the plate 11. Each core element is secured in place by means of a nut 22 which engages a washer 23 of heat insulating material. The washer 23 isolates the upper portion of the opening 21 from the remainder. Thus, the only direct metal to metal contact between the core element 14 and the plate 11 is at the peripheral edge 20 of the head 14a. To isolate the plate 11 further from heat transfer from the mold plate 2, the mold plate 2 has undercut portions 24 circumscribing the inserts 5. With this arrangement substantially all of the material in the cavity 6 can be brought to the temperature for the optimum vulcanization while the peripheral margin formed in the channel 16 is maintained at the lower temperature for limited vulcanization so as to be free from any skin effect which normally would form very quickly were the channels 16 heated to the same degree as the remainder of the mold and core.

It is desirable for a very rapid cycle that the transfer method, rather than the straight compression method, be utilized. For this purpose, the core 4 is arranged so that the material to be molded can be preheated and partially plasticized within the core 4 and then, upon closure of the mold, transferred into the mold cavities by the hydrostatic pressure built up in the charge of material by the press itself.

Figure 6:
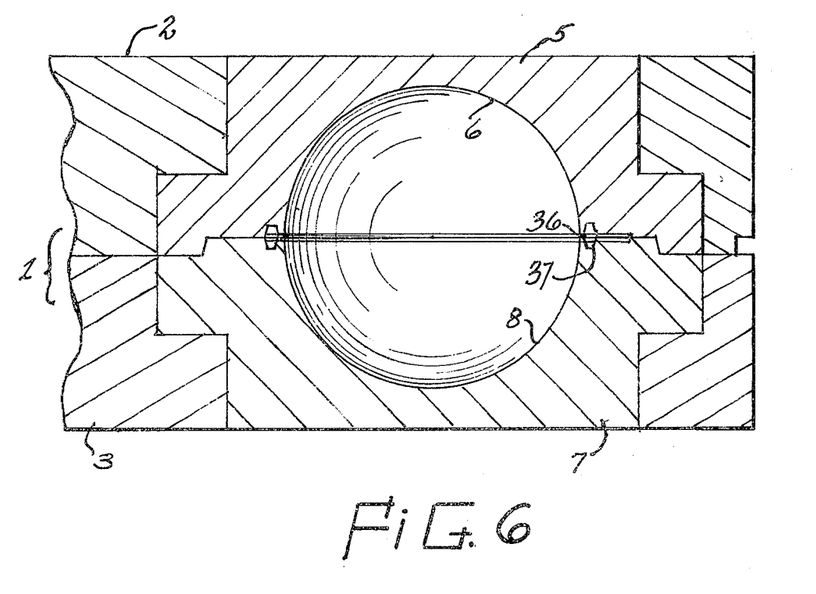
FIG. 6 is an enlarged fragmentary vertical sectional view of the mold, similar to FIG. 4, showing one cavity of the mold in the closed position of the mold and after removal of the core.

For this purpose, the core 4 includes a cylinder plate 26 having a cavity 27 therein into which the raw material is placed for heating to a preselected temperature prior to driving it into the mold cavities 6. Carried by the cylinder plate 26, in telescoping relation to the side walls of the cavity 27, is an upper or plunger plate 28. The plate 26 is provided with conventional heating passages 29, and the plate 28 is provided with conventional heating passages 30. The passages 29 accommodate electric heating elements 31, respectively, and the passages 30 accommodate heating elements 32, respectively. The passages are disposed so as to obtain as near as may be uniform heat of the material in the cavity 27. The heating elements, of course, may be controlled by the usual thermostatic or other controls so that the temperature of the material in the cavity 27 can be controlled accurately. Each of the plates 26 and 28 carries a plurality of injection nozzles 34. These injection nozzles are connected at their inner ends to the cavity 27 for receiving the material therefrom. At their outer ends, the nozzles 34 are arranged for connection to the cavities 6, respectively, upon closure of the mold. As best illustrated in FIGS. 6 and 7, each cavity 6 is provided with a restricted full ring gate 36 having a rine cavity 37. Each gate 36 is about 0.002 to 0.005 inches deep. A sprue 38 associated one with each nozzles 34, discharges into the associated ring gate 36. It is to be noted that the nozzles 34 of the plate 11 extend through passages 39 in the plate 11, and that these passages are larger in diameter than the nozzles to provide air insulating spaces between the plate 11 and the nozzles. The passages 39 are closed adjacent the discharge ends of the nozzles, as indicated at 40, by enlarged heads 41 on the nozzles 34, as best illustrated in FIG. 7, so that the spaces are dead ended, thus increasing the insulating effect and preventing the entry of the injected material into the passages 39. The plate 26 is provided with like nozzles related in like manner to the plate 26, cooling plate 12, molding plate 3, as illustrated.

Assume that a charge of raw material has been placed in the cavity 27 and brought to plasticizing temperature. As illustrated in FIG. 3, the lower plate B is raised, causing the mold plate 3 to engage the underside of the cooling plate 12 of the core 4 and lift the core until the cooling plate 11 engages the underface of the mold plate 2. As the platen B continues to rise, the reactive force imposed on the plate 11 by the upper stationary mold plate 2 causes downward movement of the plunger plate 28. The resultant reduction in the effective size of the cavity 27 develops sufficient pressure to expel the contents of cavity 27 through the nozzles and into the cavities 6 and 8. The ring gates 36 may be so shallow and restricted that frictional heat is created in the material passing therethrough in addition to that imparted in the cavity 27. As mentioned, the ring gates may be from about 0.002 to 0.005 inches deep. This assures that the material entering the cavities 6 and 8 is at a sufficient temperature so that it can flow readily and fill the cavities and channels 16 and, where not cooled locally as in the channels 16, can be brought rapidly to the optimum vulcanization temperature and so held throughout the molding operation. During molding and vulcanizing the material is confined in the cavities under sufficient pressure to prevent the material from blowing or expanding to form a foamed or reticulated structure. Meanwhile, the surface strata of material at the mateable edges, due to the cooling of the cooling plates 11 and 12, are maintained at the temperature for the limited vulcanization just above scorch or blow point and in the time cycle selected, no skin effect is produced on the faces of the edges which are to be engaged with each other. Instead, the material of these strata retain their capability of fusing and bonding into a homogeneous mass.

After the preselected time interval, during which the article halves, except for these strata, reach the high degree of vulcanization of about 60 percent of the optimum selected, the mold is opened sufficiently and the core, including the plates 11 and 12, is removed. Upon its removal, the mold is immediately closed, forcing the mateable edges, which have remained at the limited vulcanization and free from skin effect, into firm contact with each other. At this stage in the cycle, the portions in the cavities 6, which have been vulcanized to about 60 percent of the optimum and have sufficient firmness and resistance to assure that the less vulcanized or raw fusible strata of the mateable edges are forced and held together under pressure necessary for fusing and bonding into a homogeneous mass with the remainder of the material.

The temperature of the mold plates 2 and 3 for optimum vulcanization is continued after the core 4 has been removed and since the amount of material in the shallow or thin strata at the mateable edges is very small, upon reclosure of the mold, this material very rapidly rises to the temperature of the optimum degree of vulcanization and, after a time interval, becomes vulcanized to the optimum degree concurrently with the remainder of the article.

To further insulate the cooling plates 11 and 12, the cooling plate 11 is provided with cut-outs 42 which, since the plate 11 is bolted to the plate 28, provides insulating air pockets therebetween. Correspondingly, the cooling plate 12 is provided with cut-outs 43 which provide insulating pockets between it and the plate 26.

Upon opening the mold, the material remaining in the cavity 27 after vulcanization is readily accessible for removal in one piece. Due to the taper of the passages in the nozzles, the material therein, being integral with the material remaining in the cavity, is also removed therewith.

If the core 4 is to be used only for the conventional compression molding, the nozzles 34 are eliminated and the plates 26 and 28 are in the form of a single rigid plate, the cavities being individually charged with slugs of raw material.

In the present method, as mentioned, the mold plates 2 and 3 and the heads 14a of the core elements 14 are maintained at a temperature of, for example, 320° to 400° F., for the particular charge of material. This advanced state of heating to optimum vulcanization temperature provides a minimum of time period for a complete charging and vulcanization cycle. The compression molding cycle may be as low as 4 minutes.

Figures 8, 9, 10:
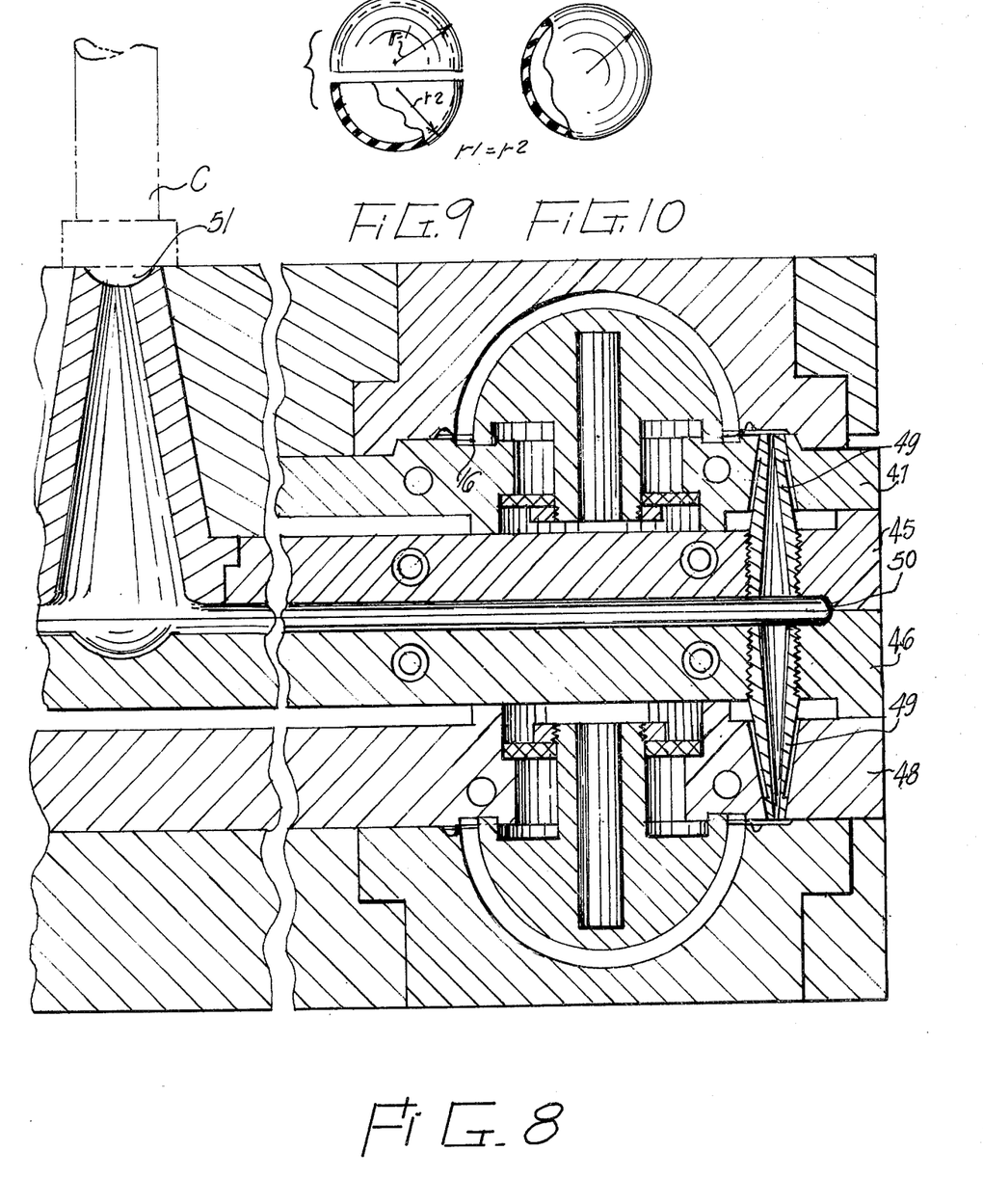
FIG. 8 is a view similar to FIG. 4, showing a modification of the core for injection molding.
FIG. 9 is a front elevation, partly in section, showing the two premolded and vulcanized halves of a tennis ball core in position after the core has been removed and before the mold is closed.
FIG. 10 is a side elevation, partly in section, of a complete tennis ball core.

As illustrated in FIG. 8, if injection molding is desired, the core may be in the form of two base plates 45 and 46 and cooling plates 47 and 48, and nozzles 49 corresponding to the nozzles 34. The plates 45 and 46 are provided at their parting line with runners 50 which lead to the nozzles 47 and which are connected by a sprue 51 to a conventional plasticizing and injecting cylinder C which supplies pre-plasticized heated material to the cavities. In other respects, this modification is functionally the same as the preferred form of the invention.

The injection cycle of this modified method may be as low as 30 seconds.

Thus, in all cases, full advantage is taken of the fact that the mold plates are continuously being heated to the temperature required for optimum vulcanization so as to provide a much shorter period of confinement of the material in the mold cavities for causing the material to reach a state of stability and retain its shape and contact with the cavity walls without the necessity for introducing any gassing agent or interior pressure medium for producing a high pressure differential within the article.

The localized areas of the cooling plates near the mateable edge forming channels may be cooled by the usual circulating water or other cooling media. For a particular charge, as mentioned, this lower temperature at the mateable edges can be within the ranges of 200° F. to 225° F., which is adequate to prevent any skin effect from developing at the mateable edges, while the cavity walls are maintained at from 320° F. to 400° F. for this same material. Thus vulcanization of the material in the cavity is carried far beyond the blow or scorch stage while the strata of the edges are in a state of limited vulcanization only slightly beyond the blow of scorch stage.

During opening of the mold and removal of the core, the molded parts retain their positions in the cavity due to frictional adherence to the cavity walls greater than the pull required for releasing the core from the molded parts. Upon reclosing the mold, the companion halves of the articles are brought together toward each other in alignment and their mateable edges, which are in a readily fusible state and free from skin effect, interpenetrate and bond together forming a unitary and homogeneous structure with the remainder of the parts of the article.

As mentioned above, the vulcanization period required during molding about the core is about four minutes for compression molding and about thirty seconds for injection molding, with the result that the entire cycle for producing the finished products is about 6 minutes for the transfer type of molding and 90 seconds for the injection type of molding.

Having thus described my invention, I claim:

1. The method of forming a hollow article from moldable settable material by molding the material about a core in a segmental pressure mold having complementary parting surfaces, respectively, and comprising:

charging with unset settable moldable material a segmental mold having a cavity shaped to impart a predetermined exterior configuration to the article and in which cavity a removable core having a shape to impart a predetermined interior configuration to the article is supported, said core having a portion disposed between at least a portion of said parting surfaces and shaped to impart to at least part of the article at its periphery, aligned spaced mateable edges, respectively, from between which the core can be withdrawn from the article when mold pressure is relieved and the mold is opened sufficiently, and at least one of which edges, at each aligned unit of the length of said edges, is disposed beyond the adjacent complementary parting surfaces of the mold segments themselves, after removal of the core, a distance sufficient so that after removal of the core, the spaced mateable edges will be juxtaposed in face to face relation under pressure by movement of the mold segments to fully closed positions;

confining and molding the material by the mold segments and core under predetermined molding pressure in the space between the walls of the cavity and core;

subjecting the confined material, except for a small edge forming portion, which edge portion begins at the mateable faces of said edges and continues therefrom for a slight depth, to a predetermined temperature required for effecting the setting reaction of the material, continuously until the reaction has proceeded to a high degree which is beyond the scorch stage of the material and is sufficient to create a skin over the molding surfaces and impart structural and dimensional stability thereto;

concurrently maintaining said edge forming portion of the material at a lesser temperature so as to initiate the setting reaction thereof and carry said setting reaction to a lesser degree, which lesser degree is below the skin forming stage so that the mateable edges are free from skin effect, are firm enough to transmit substantial pressure upon closure of the mold, and are fusible and bondable;

then opening the mold and immediately removing the core therefrom, and immediately reclosing the mold under molding pressure;

immediately after reclosure of the mold, subjecting all of said material, including said edge forming portion, to said predetermined temperature;

continuing the application of heat until the setting reaction of all of the material is carried to completion; and then opening the mold and removing the molded material from the mold.

2. The method according to claim 1 wherein said lesser degree to which the reaction of the edge forming material is carried is slightly above that at which the edge forming material would foam if the molding pressure were released.

3. The method according to claim 1 wherein the material is a vulcanizable elastomeric material and said setting reaction is a vulcanizing reaction, and said high degree of vulcanization is about 60 percent of the optimum vulcanization.

4. The method according to claim 1 wherein the temperature of said edge forming portion is maintained at the lower temperature by the application of cooling media to the material at said edge forming portion.

5. The method according to claim 4 wherein said cooling media are applied by applying the same to the core adjacent the edge forming portions.

6. The method according to claim 1 whereby, after removal of the core, the mold sections are reclosed and said edges fused and bonded in the absence of any pressurizing agent in the interior of the article.

7. The method according to claim 1 wherein the material is molded to form concurrently separately shaped, disconnected, concavo-convex companion parts of an article which are to be joined together with their concavities open toward, and aligned with, each other; which parts, in molded condition, have the final shape they are to have in the article except at said mateable edges; said aligned mateable edges are at the open sides of the cavities, respectively; each of said edges is substantially coextensive in length with the entire juncture to be formed between the parts, and is coextensive in width with the thickness of the wall of the article adjacent thereto; and said mateable edges are disposed relative to the parting surfaces so that, after the core is removed, they can initially engage throughout the entire length of the juncture upon partial closure, and before final closure, of the mold segments.

* * * * *